I. F. HERRIN, OF SAN ANTONIO, TEXAS.

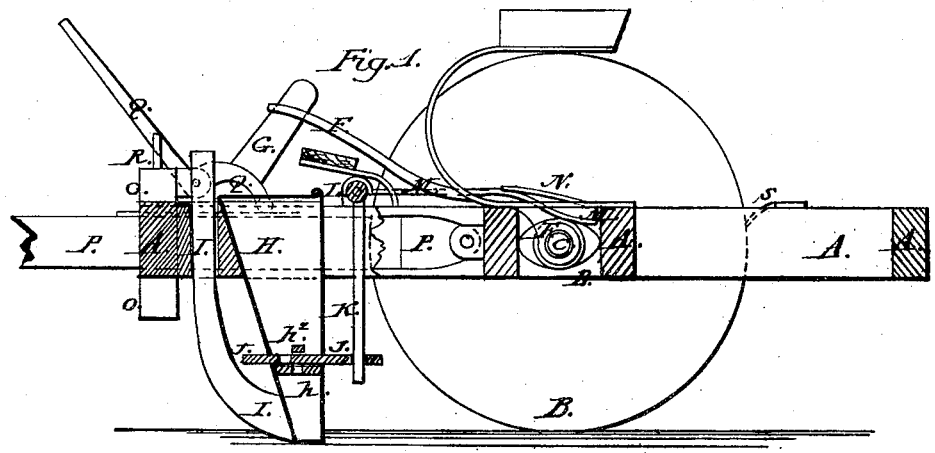
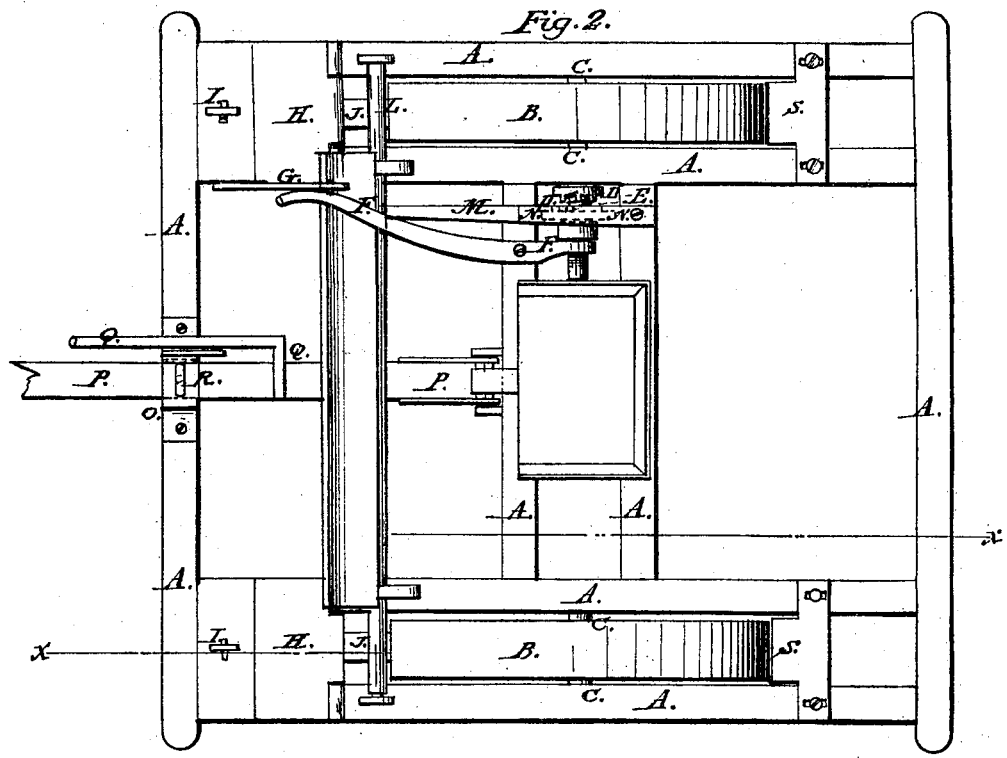

Letters Patent No. 88,870, dated April 13, 1869.

IMPROVEMENT IN SEED-PLANTERS.

The Schedule referred to in these Letters Patent and making part of the same.

*To all whom it may concern:*

Be it known that I, I. F. HERRIN, of San Antonio, in the county of Bexar, and State of Texas, have invented a new and useful Improvement in Seed-Planters; and I do hereby declare that the following is a full, clear, and exact description thereof, which will enable others skilled in the art to make and use the same, reference being had to the accompanying drawings, forming part of this specification, in which—

Figure 1 is a detail vertical section of my improved machine, taken through the line $x$ $x$ of fig. 2.

Figure 2 is a top or plan view of the same.

Similar letters of reference indicate corresponding parts.

My invention has for its object to furnish a simple, convenient, effective, and accurate machine, by means of which the planting may be readily done in exact check-row, and which will allow the dropping device to be instantly thrown into or out of gear when desired; and It consists in the construction and combination of various parts of the machine, as hereinafter more fully described.

A is the frame of the machine, which is supported by the wheels B, the journals C of which revolve in bearings in the longitudinal bars of the said frame A.

To one of the journals C is attached one part of the clutch D, the other part of which slides upon the said journal C, and which is held out of gear with the other part of said clutch by the coiled spring E.

The sliding part of the clutch is moved up to gear into its other part by the lever F, which is pivoted to a cross-bar of the frame A, and through a hole in the rear end of which passes the inner end of the said journal C.

If desired, the coiled spring E may be so arranged upon the journal C as, by its elasticity, to force the sliding-part of the clutch D into gear with the other part. In this case the lever F is used to force the said sliding-part of the said clutch out of gear with the other part.

The forward end of the lever F extends forward into such a position that it may be operated by the driver with his foot. The forward end of the lever F is held in place, when adjusted to compress the spring E, by the catch-arm G, attached or pivoted to the frame A of the machine.

H are the seed-hoppers, which extend down to the ground, so as to serve as conductor-spouts, to convey the seed to the ground.

The ground is opened to receive the seed, by the cutters, or knives I, which are made curved in about the shape of the forward part of a sleigh-runner, and the lower or rear ends of which are secured to the lower end of the hoppers H. The upper or forward ends of the cutters I pass up through holes in the bars or beams of the frame A, where they may be secured in place by pins passing through them above said beams or frame, or by other convenient means.

J is the sliding-valve or dropping-plate, which has a hole through it of such a size as to contain the exact amount of seed necessary for a hill, and which slides back and forth above or upon the bottom $h^1$ of said hopper.

The bottom $h^1$ of the hopper has a hole or opening through it, for the passage of the seed to the ground.

$h^2$ is a guard-bar, which crosses the lower part of the hopper H just above the sliding-valve plate J, and directly over the hole in the bottom $h^1$ of said hopper, so as to prevent the seed from escaping when the sliding-plate J is in position to drop the seed.

Through a hole in the rear end of the sliding dropping-plate J, passes the lower end of the arm K, the upper end of which is securely and rigidly attached to the rock-shaft L, which works in bearings in the frame A of the machine.

M is an arm, the forward end of which is rigidly attached to the rock-shaft L, and the other end of which extends back into such a position as to be operated by the cam-wheel formed upon or attached to the sliding-part of the clutch D, so that when the sliding-part of said clutch is in gear with and carried around by the other part of said clutch, the sliding-valve plate J may be operated.

By making the cam-wheel of the clutch D double, or with a cam upon its opposite sides, the dropping-plates J may be operated twice at each revolution of the drive-wheel.

The rear end of the lever, or arm M, is held down in proper position, to be operated upon by the cam-wheel of the clutch D, by the spring N, one end of which is attached to the frame A, and the other end of which rests upon the said arm M, as shown in fig. 1.

The middle part of the front cross-bar of the frame A is cut through the severed ends of said cross-bar, being connected by bars O, the middle parts of which are bent upward and downward, as shown in fig. 1, so as to form a vertical slot for the tongue P to pass through and work in.

The rear end of the tongue P is pivoted to the central cross-bars of the frame A, as shown in figs. 1 and 2.

Q is a lever, which is pivoted to a support attached to the forward part of the frame A, and the lower end of which is provided with an arm, projecting across the upper side of the tongue P, so that by operating the said lever Q, the said tongue P may be forced into and locked in the lower part of the slot in which it works, raising the cutters I and hoppers H away from the ground, for convenience in passing from place to place, or in turning around.

The upper bar of the tongue-slot is provided with a set-screw, R, which passes through said bar, so that its lower end may project downward to serve as a stop to regulate the depth at which the seed is deposited in the ground, by adjusting the line of draught.

S are scrapers, which are secured to the frame A by screws passing through slots in said scrapers. The scrapers S are placed in the rear of the wheels B in such positions as to scrape off the soil that may adhere to them.

Having thus described my invention,

I claim as new, and desire to secure by Letters Patent—

The combination of the lock-lever Q, bars O, and set-screw R, with each other, the tongue P and frame A, arranged substantially as described, for the purpose specified.

The above specification of my invention signed by me, this 1st day of December, 1868.

I. F. HERRIN.

Witnesses:
WILLET A. THIRLEPAPE,
W. J. LOCKE.